Oct. 6, 1970     Z. STACHURSKI     3,532,548
ELECTROCHEMICAL CELL UTILIZING THREE ELECTRODES
Filed Oct. 25, 1966
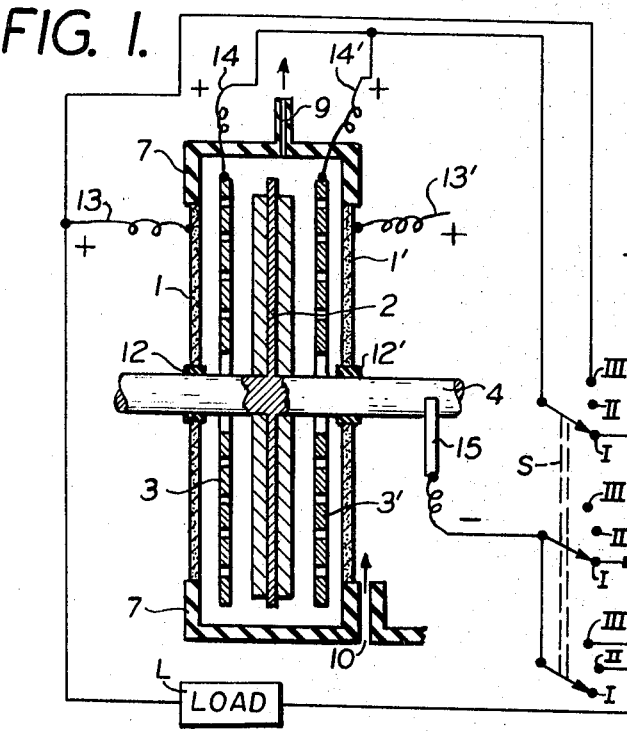
FIG. 1.
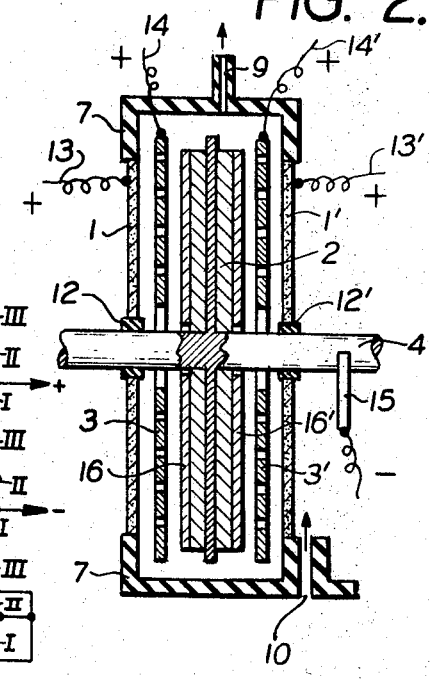
FIG. 2.
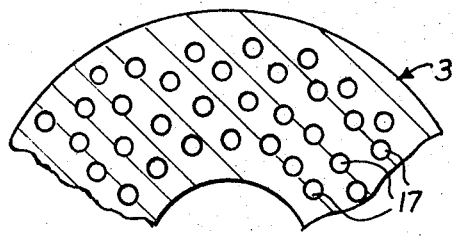
FIG. 3.
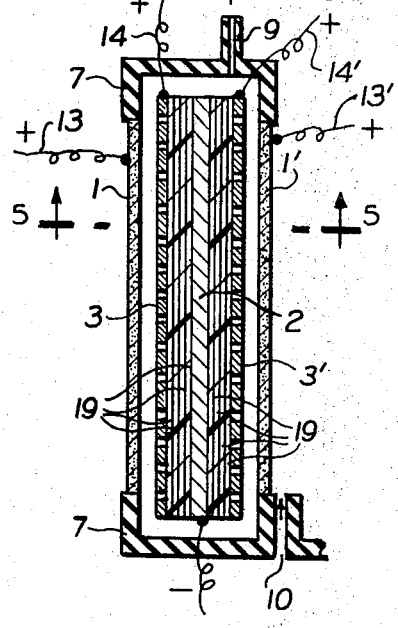
FIG. 4.
FIG. 5.
INVENTOR
ZBIGNIEW STACHURSKI
BY
Evelyn Sommer
ATTORNEY.

United States Patent Office 3,532,548
Patented Oct. 6, 1970

3,532,548
ELECTROCHEMICAL CELL UTILIZING
THREE ELECTRODES
Zbigniew Stachurski, Brooklyn, N.Y., assignor to Yardney International Corp., New York, N.Y., a corporation of New York
Filed Oct. 25, 1966, Ser. No. 589,424
Int. Cl. H01m 29/04, 27/02
U.S. Cl. 136—86                                                  4 Claims

ABSTRACT OF THE DISCLOSURE

A hybrid fuel cell has a negative electrode of oxidizable active material such as zinc; a pair of air-depolarizable positive electrodes, e.g. of carbon or silver; and a pair of auxiliary electrodes of a metal more electropositive than that of the negative electrode, such as nickel, interposed between the negative electrode and the two air-depolarizable electrodes. On charge, the negative and auxiliary electrodes are connected in circuit while the air-depolarizable positive plates are inactive; on discharge, the circuit includes the latter electrodes together with the negative plate, the auxiliary electrodes being optionally connectable in the same circuit for high-rate operation.

---

The present invention relates to a novel electrochemical cell and more particularly relates to an electrochemical cell having three energy-producing electrodes.

The electrochemical cell of this invention is a modification of a "hybrid fuel cell" which makes it possible to operate at higher energy-output rates than is otherwise the case. The term "hybrid fuel cell" as used herein designates a cell consisting of two principal electrodes one of which is continuously fed with a reactant such, i.e. oxygen as a component of air, and whose other electrode functions as in a conventional battery undergoing alternate charging and discharging.

In U.S. Pat. No. 3,219,486 there has been described and claimed a rechargeable electric battery in which there is provided a separate or auxiliary electrode, composed of an inert material which is substantially nonoxidizable in the electrolyte, which does not participate in the discharge portion of the cycle but which functions as a counterelectrode during subsequent charging. During this charging portion of the cycle, the positive electrode is inactive. Thus, rechargeable electric battery described in that prior patent involves the use of a third electrode which serves solely as a counterelectrode for use in recharging the negative electrode.

It is general knowledge that nickel-zinc cells can be discharged at high rates but that such cells have only a medium energy-to-weight ratio. Likewise, it has been recognized that oxygen-zinc cells have large energy-to-weight ratios but cannot be operated at high rates.

It is the principal object of the present invention to provide a high-energy electrochemical cell which can be discharged at high rates, thus combining the advantages of both the oxygen-zinc and nickel-zinc cells.

In accordance with this invention I provide a high-energy electrochemical cell utilizing three electrodes including two positive electrodes, one of which is a gas or oxygen electrode, and one negative electrode, the other positive electrode carrying out a double function by serving as the charging electrode and also as a supplementary positive electrode in periods where high rate discharge is required.

According to a further feature of the invention, a cell as just described includes as its two positive electrodes an oxygen electrode and a nickel/nickel-oxide electrode, the negative electrode being a zinc/zinc-oxide electrode, the latter being advantageously rotatable with reference to the rest of the assembly.

The above and other objects, features and advantages of the invention will become more fully apparent from the following description and the accompanying drawing wherein:

FIG. 1 is an axial sectional view of an electrode assembly of a "hybrid fuel cell" in accordance with the invention;

FIG. 2 is a related view similar to FIG. 1 of a cell including a wiper;

FIG. 3 is a partial enlarged sectional view of an auxiliary positive electrode included in the assembly of FIGS. 1 and 2;

FIG. 4 is an axial sectional view of another embodiment of a "hybrid fuel cell" according to the invention; and FIG. 5 is a cross-sectional view of the cell of FIG. 4 taken along line 5—5 thereof.

In accordance with this invention, there is provided a high-energy electrochemical cell utilizing three electrodes i.e. a positive first electrode having a porous body consisting at least in part of carbon, silver, platinum or palladium for promoting the reduction of oxygen upon the introduction of an oxygen-containing gaseous fluid into the pores of the electrode body, a negative rechargeable second electrode containing as its active material an oxidizable base metal, e.g. zinc, cadmium, iron or tin, and a third positive rechargeable third electrode of the type conventionally employed in a current-producing couple with an electrode of the type of the second electrode.

The gas (oxygen) electrode may be of any construction known in the prior art to be suitable for this purpose. Typical constructions which may be used include porous high-density carbon plates impregnated with a suitable catalyst, porous sheet silver or sintered silver, a catalyst spread upon a thin porous wire mesh, all of which may be treated to make them appropriately hydrophobic, i.e. with Teflon. The porosity and extent of wet-proofing of these materials are preferably such that gas at one atmosphere applied to the face of the electrode disposed in the electrolyte will not displace electrolyte therefrom. Other materials which are satisfactory for making the oxygen or air electrode are disclosed in U.S. Pats. Nos. 2,914,596, 2,017,280 and 2,010,608. A preferred electrode is one consisting of nickel wire mesh 70 (wires/inch) on which is spread active carbon catalyst and Teflon.

The rechargeable negative electrode may be of any suitable, oxidizable active metal, specifically those mentioned above. These materials will be in their metallic forms or in the form of their oxides or hydroxides, depending on the state of charge of the rechargeable electrode. In one of the embodiments of the invention illustrated in the drawing, the rechargeable negative electrode is a zinc/zinc-oxide electrode capable of movement within the electrolyte relative to the other members of the cell. Such electrodes have been described and claimed in copending applications Ser. No. 441,069 and 441,265.

In accordance with the invention, the negative electrode (preferably a zinc/zinc-oxide electrode) is charged against a third electrode or counterelectrode. As such a counterelectrode there may be used the rechargeable or electrochemically reversible cathodes of the type conventionally employed in a current-producing couple with a zinc/zinc-oxide anode. Of most significance in this regard are silver/silver-oxide and nickel/nickel-oxide electrodes, the latter being preferred.

The electrolyte used in the cell in accordance with the present invention will vary with the electrodes employed. Aqueous alkaline electrolytes are particularly suited for this purpose. A preferred electrolyte is an aqueous solution of KOH having a concentration of about 15% to 50%. Aqueous KOH of about 44% is particularly suitable.

In the drawing, a modified hybrid fuel cell according to the invention is shown generally in FIG. 1 and comprises an outer housing 7 preferably made of electrically non-conductive material. Typical materials that may be employed for this purpose include the synthetic plastics, such as polymethylmethacrylate, copolymeric acrylonitrile - methylstyrene, copolymeric acrylonitrile - styrene, high-density nylon and high-density polyethylene.

The housing 7 may also be made of electrically conductive material in which event the electrodes or their terminals, described more in detail below, are insulated by suitable insulating means such as rubber sleeves therefrom. The individual cell housings may be spaced apart to permit access by air to an oxygen electrode 1 as, for instance, through a space 10. The partially deoxygenated air may leave the system by the same means or may penetrate the oxygen electrode and leave by a gas vent 9.

In the arrangement shown in FIGS. 1 and 2, two oxygen electrodes 1 and 1' constitute opposite faces of the housing 7. The oxygen electrodes 1 and 1' are penetrated by a drive shaft 4 and are fitted with seals 12 and 12' to prevent loss of electrolyte from the housing. Two auxiliary positive electrodes 3 and 3' consist, advantageously, of perforated nickel plaques impregnated with nickel oxide; the perforations are required in order to permit current flow between the air electrodes 1 and 1' and a negative electrode 2 here shown as a displaceable electrode mounted on the drive shaft 4.

Positive leads 13, 13' and 14, 14' are tied to the air electrodes 1, 1' and to the auxiliary electrodes 3, 3', respectively. Positive leads 13, 13' may be connected directly to the external surfaces of air electrodes 1, 1' whereas the leads to the auxiliary positive electrodes 3, 3' extend outwardly through the housing. The electrical connection to the negative electrode is constituted by the drive shaft 4 with an external brush 15.

During the charge portion of the cycle, the cell as part of a battery is connected via a switch S (position I) to an external source of current (not shown) in a circuit including only the auxiliary positive plates 3 and 3' and the negative plate 2. The polarity of the current source is such that the positive plates are oxidized and the negative plate reduced. At the beginning of this operation, where a cell of the nickel-oxide zinc type is involved, the nickel is oxidized as follows: Ni+→Ni+, absorbing the appropriate quantity of oxygen, while metallic zinc is deposited upon the rotating electrode 2. In general, it may be assumed that the electrical storage capacity of the auxiliary electrodes 3 and 3' will be less than that of the negative electrode 2. Consequently, the auxiliary electrode will reach full charge first. Beyond this point, the reaction at the auxiliary positive electrodes 3 and 3' will consist entirely of the evolution of oxygen, although oxygen generation will have started at an intermediate stage during the charging of the auxiliary plates as is well known to those familiar with the operation of cells containing nickel positives.

When the reduction of the zinc from its oxidized state is substantially complete, evolution of hydrogen at the negative electrode will commence. All of the gases generated during charge will leave the cell through a gas vent where they may pass to a unit not shown in which they can recombine to form water which can then be recycled to the cells through a port not shown. For the operation of discharge at normal low and moderate rates, in a circuit including a load L, the auxiliary electrode can be disconnected by the switch S (position II) which can be automatically or manually operated and the task of current generation is then entirely accomplished by means of air electrodes 1 and 1' and negative electrode 2.

As noted above, auxiliary electrodes 3 and 3' are perforated, the function of the perforations being to permit current to flow directly between electrodes 1 and 1' and plate 2 without the shielding effect which would otherwise be introduced.

For high rate operation, when the voltage produced by the air electrode is low, the auxiliary electrodes 3 and 3' are brought into operation in conjunction with air electrodes 1 and 1' by the switch S in position III.

A double advantage accrues from the use of an auxiliary electrode with an air electrode. The first advantage is the inherently greater voltage of the nickel-oxide electrode as against the air electrode. This increase can amount to 0.4 to 0.7 volt at comparable current densities. In addition, the nickel-oxide electrode can function effectively at high current densities in a range where the voltage output from the air electrode is intolerably low.

It can be seen then that an auxiliary electrode such as the nickel-oxide electrode 3 or 3' makes it possible for the above-described system to cope with a demand for high current pulses or surges. Such a demand can arise in connection with the operation of an electric automobile or in the changeover from reception to transmission in communication systems.

FIG. 2 differs from FIG. 1 only in that wiper elements 16 and 16' for use in connection with the negative electrode 2 are included. The wiper element has been described in detail in copending application Ser. No. 441,069.

FIG. 3 is an enlarged detail view of part of auxiliary electrode. As can be seen from the drawing, the electrode substance contains a multiplicity of perforations 17. The total area of the perforations may amount from about 20 to 70% of the area of the electrode depending on the load profile. This must take into account both the magnitude of the expected current and its duration. It can be appreciated that the capacity of the auxiliary electrode in terms of ampere-hours is substantially lower than that of the zinc electrode. Accordingly, the number of pulses which can be drawn through use of the auxiliary electrode is thereby limited. In general, this is not a serious disadvantage since the capacity ratio of the positive and negative plates can be adjusted to meet most load profiles.

In FIGS. 4 and 5, another possible arrangement is shown utilizing a stationary negative electrode 2. The stationary electrode is the conventional zinc, cadmium, tin or iron electrode. Where the stationary electrode is used, it is desirable to incorporate one or more layers of separator material 19 to prevent shorting between the electrodes of opposite polarity. As is well known, zinc particularly tends to deposit in the form of dendrites which quickly effect bridging and to use international short circuits. This difficulty is avoided in the illustrated embodiments by use of rotating electrodes as in FIG. 1, by wipers as shown in FIG. 2 or by incorporation of separators 19 as in FIGS. 4 and 5. The separators are of the semipermeable type made of compositions well known in the art. Illustrative examples of such compositions are regenerated cellulose and PVA films.

I claim:

1. An electrochemical cell comprising a housing; negative electrode means comprising a central plate of oxidizable active material in said housing; oxygen-depolarizable positive electrode means forming part of opposite walls of said housing and flanking said central plate; oxidizable auxiliary electrode means of a metal more electropositive than the active material comprising perforated plate means interposed between the negative electrode means and the positive electrode means, the perforated plate means being on opposite sides of the central plate; and an alkaline electrolyte in said housing, contacting all the electrode means; charging means including said auxiliary electrode means for charging the negative electrode means independently of the positive electrode means; discharge means including the positive electrode means for discharging the negative electrode in the presence of an oxygen flow along the positive electrode means; and switch means operable to connect the auxiliary electrode means with the negative and positive means for accelerated discharge.

2. A cell as defined in claim 1 wherein said auxiliary electrode means has an electrical storage capacity less than that of said negative electrode means.

3. A cell as defined in claim 1 wherein said active material is zinc and said more electropositive metal is nickel.

4. A cell as defined in claim 1 wherein said positive electrode means consists essentially of carbon, silver, platinum or palladium.

References Cited

UNITED STATES PATENTS

| | | | |
|---|---|---|---|
| 3,300,345 | 1/1967 | Lyons | 136—86 |
| 3,069,486 | 12/1962 | Solomon et al. | 136—30 |
| 3,201,281 | 8/1965 | Solomon et al. | 136—30 |
| 3,338,746 | 8/1967 | Plust et al. | 136—3 |

ALLEN B. CURTIS, Primary Examiner

U.S. Cl. X.R.

136—164